(12) United States Patent
Rehn

(10) Patent No.: US 9,405,383 B2
(45) Date of Patent: Aug. 2, 2016

(54) DEVICE AND METHOD FOR DISAMBIGUATING REGION PRESSES ON A CAPACITIVE SENSING DEVICE

(71) Applicant: SYNAPTICS INCORPORATED, San Jose, CA (US)

(72) Inventor: Chris Rehn, Taipei (TW)

(73) Assignee: Synaptics Incorporated, San Jose, CA (US)

( * ) Notice: Subject to any disclaimer, the term of this patent is extended or adjusted under 35 U.S.C. 154(b) by 212 days.

(21) Appl. No.: 14/021,583

(22) Filed: Sep. 9, 2013

(65) Prior Publication Data

US 2015/0070278 A1  Mar. 12, 2015

(51) Int. Cl.
*G06F 3/0354* (2013.01)
*G06F 3/044* (2006.01)

(52) U.S. Cl.
CPC ........ *G06F 3/03543* (2013.01); *G06F 3/03547* (2013.01); *G06F 3/044* (2013.01)

(58) Field of Classification Search
CPC ..... G06F 3/044; G06F 3/0414; G06F 3/0383; G06F 2203/0337; G06F 3/03543; G06F 2203/04111; G06F 3/03547
USPC .................................................. 345/156–174
See application file for complete search history.

(56) References Cited

U.S. PATENT DOCUMENTS

| | | | |
|---|---|---|---|
| 2010/0201626 A1* | 8/2010 | Krah et al. ................... | 345/163 |
| 2010/0242274 A1 | 9/2010 | Rosenfeld et al. | |
| 2013/0154933 A1* | 6/2013 | Sheik-Nainar ............... | 345/163 |

* cited by examiner

*Primary Examiner* — Alexander Eisen
*Assistant Examiner* — Abhishek Sarma
(74) *Attorney, Agent, or Firm* — Osha Liang LLP

(57) ABSTRACT

An input device and method for use with an electronic system include a chassis having an interactive region; an input surface configured to deflect relative to the chassis in response to applied force, the input surface having a first region and a second region; and a processor communicatively coupled to the input surface and configured to disambiguate the first and second regions based on interaction between the input surface and the interactive region.

15 Claims, 7 Drawing Sheets

DEVICE AND METHOD FOR DISAMBIGUATING REGION PRESSES ON A CAPACITIVE SENSING DEVICE

TECHNICAL FIELD

This invention generally relates to electronic devices, and more specifically relates to sensor devices and using sensor devices for producing user interface inputs.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some input devices also have the ability to detect force applied to a sensing surface in addition to determining positional information. For example, Degner U.S. Patent Application Publication No. 2010/0079404 discloses an input device having a touch-sensitive track pad capable of detecting an X-Y position of an input object proximate the track pad, as well as a movement indicator for detecting movement of the movable track pad. Thus, a user can press down and "click" the pad to simulate a button press. FIG. 3B of Degner illustrates a clickable input pad configured for uniform translation; that is, the entire input surface deflects uniformly regardless of the X-Y location of the applied force. FIGS. 3C and 5 of Degner illustrate a hinged pad which pivots about a hinge, and deflects much like an aileron or door.

Both hinged and uniform clickable pads typically employ a mechanical or electronic switch, such as a rubber domed tach switch, to detect movement of the pad to perform a button click, as well as a spring mechanism to restore the pad to its original position following a button click. A typical resilient hinge for providing the restoring force is shown in FIGS. 6 and 28 of Degner.

Capacitive input devices in the form of a computer mouse are also known. For example, the Microsoft™ Arc Mouse and the Apple™ Magic Mouse employ a two-dimensional position sensor on the outside surface of a clickable mouse housing.

Presently known capacitive sensing mice utilize a single mechanical or electronic tach switch under a snap dome to detect a button press. When a finger is present on only the right button during a button press, the device indicates a right button press. Conversely, when a finger is present on only the left button during a button press, the device indicates a left button press. However, when two (or more) fingers are present on the sensing surface during a button press, the device is unable to determine whether the left or right button was intended, and therefore indicates a default button (typically a left button) press even though another button (e.g., the right button) may have been intended by the user. Consequently, it is difficult to determine which button (e.g., left or right) is pressed when multiple fingers are present.

BRIEF SUMMARY

The embodiments of the present invention provide a device and method that facilitates improved device usability. Specifically, the device (e.g., a computer mouse) and method provide improved user interface functionality by facilitating user input with multiple input objects (e.g., fingers) using a depressible housing having a capacitive sensing surface for determining which of two (or more) button regions is pressed. For this purpose, the input device also includes a chassis having a conductive surface that interacts with the capacitive sensing surface responsive to applied force, and a processing system adapted to determine the relative positions of the respective buttons with respect to the conductive surface to thereby determine which button was pressed.

BRIEF DESCRIPTION OF DRAWINGS

Preferred exemplary embodiments will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability by providing an improved hinged input pad which simulates a button press when the input pad surface is deflected downwardly by an input object.

Figure 1:
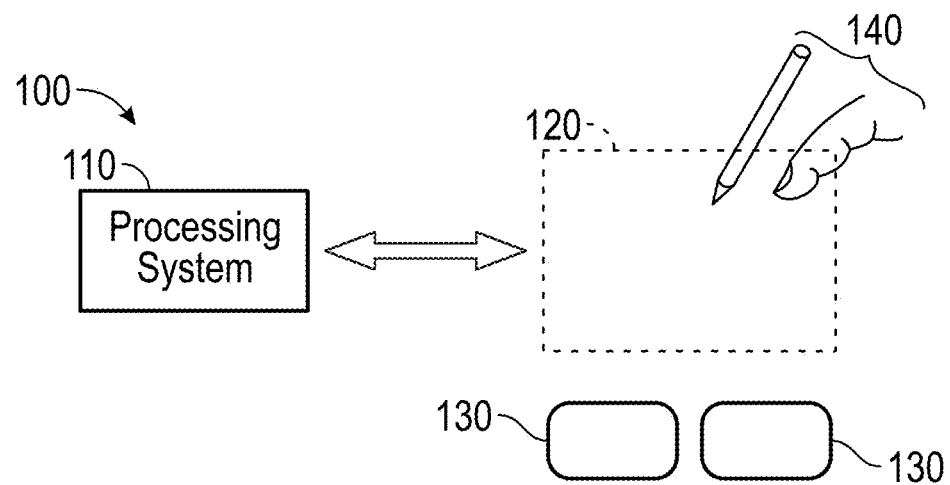
FIG. 1 is a block diagram of an exemplary electronic system that includes an input device and a processing system in accordance with an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad" or "touch sensor device") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor in the sensing region. This force information can then also be used by the system to provide a wide range of user interface functionality, for example, by providing different user interface functions in response to different levels of applied force by objects in the sensing region.

Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In various embodiments, the input device further comprises one or more force sensors as part of an interface for an electronic system. The input device has a processing system, an input surface, sensing region and a single or multiple force sensors implemented proximate the sensing region. Furthermore, it should be noted that one or more force sensors may be provided inside or outside the perimeter of the input surface. The input device uses both the proximity sensor and the force sensor(s) to provide an interface for an electronic system.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner. In various embodiments, the force sensors may be based on changes in capacitance and/or changes in resistance.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit.

As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists).

In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning.

As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110).

Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As noted above, the embodiments of the invention can be implemented with a variety of different types and arrangements of capacitive sensor electrodes. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction.

In still another embodiment, the sensor electrodes can be arranged to provide positional information in polar coordinates, such as "Γ" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

Figure 2:
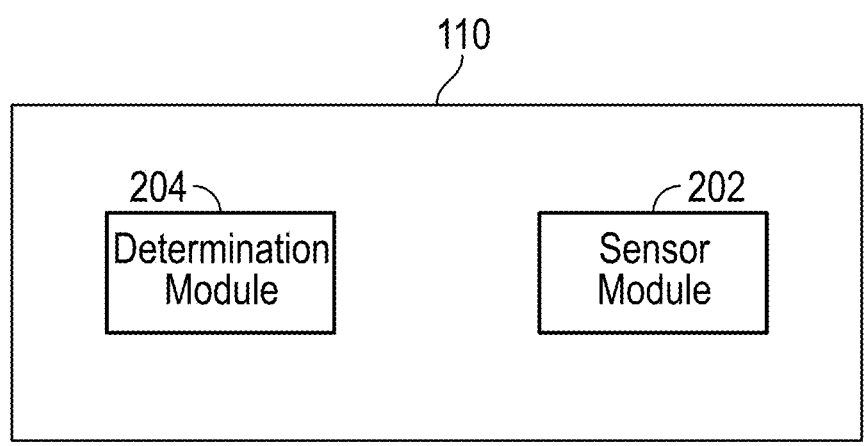
FIG. 2 is a schematic view of an exemplary processing system in accordance with an embodiment.

Referring now to FIGS. 1 and 2, the processing system 110 includes a sensor module 202 and a determination module 204. Sensor module 202 is configured to receive resulting signals from the sensor electrodes associated with sensing region 120. Determination module 204 is configured to process the data, and to determine positional information and the force information for one or more input objects in the sensing region.

Presently known capacitive mouse-type input devices are lacking in their ability to determine whether a left or a right button press is intended when multiple fingers are present on the sensing surface during a button press. Accordingly, various embodiments of the present invention provide a software/firmware solution by using a capacitive sensing surface configured to sense positional information (e.g., the number and/or location of fingers) as well as the deflection of the input surface relative to a conductive portion of the chassis. The capacitive sensing surface thus generates resulting signals (also collectively referred to as a resulting signal) which include a positional component and a force (or displacement) component.

In an embodiment, the capacitive sensing surface includes both transmitter and receiver electrodes which interact transcapacitively with the finger(s) as well as with the conductive surface of the chassis. As such, changes in capacitance due to the presence of the finger(s), and changes in capacitance resulting from the deflection of the capacitive sensing surface towards the conductive surface of the chassis, are additive.

The resulting signals may be modeled as a composite signal which includes two superimposed components attributable to: i) the presence of a finger on one or more regions (e.g. "buttons") of the capacitive sensing surface; and ii) deflection of the respective regions of sensing surface with respect to the device chassis. The composite signal may analyzed by a processor to assess the individual traits of each component, for example, by deconvolving the composite signal into i) position information; and ii) deflection information, whereupon the deflection information may be used to determine whether a right or left "click" is intended. Alternatively, the combined signal may be analyzed without deconvolving, for example, by identifying a peak value within the image data, discarding electrode values within a predetermined distance (e.g., a finger width) of the peak, and fitting a line to the remaining data. That is, the processing may begin with the total superimposed image, then ignore what can be recognized intuitively (e.g., algorithmically) as the presence of a finger, declare the remaining image data as being due to deflection, and determine a right or left click based on the deflection information.

Figure 3:
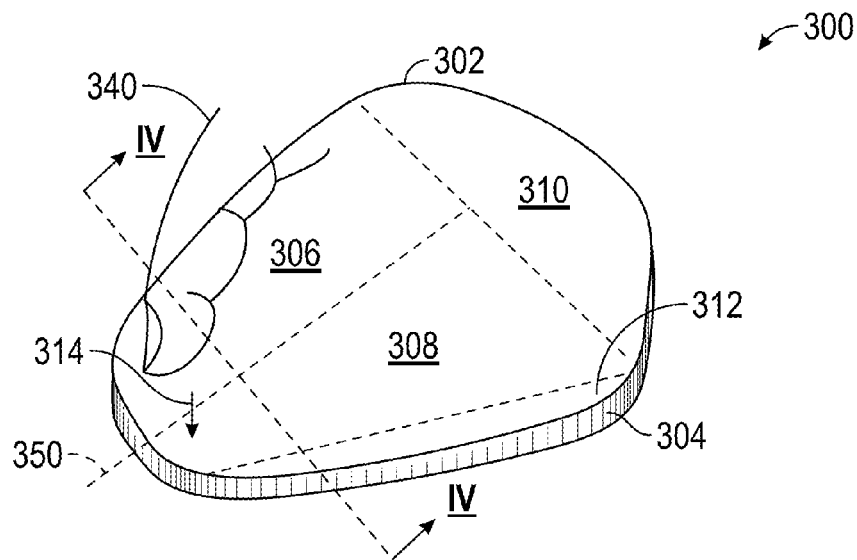
FIG. 3 is a perspective view of a mouse-type input device having multiple touch zones on a sensing surface in accordance with an embodiment.

Referring now to FIG. 3, an input device 300 includes a sensing surface 302, such as a dome-shaped surface as used in computer mice, configured to pivot or otherwise deflect with respect to a chassis 304. In the illustrated embodiment, the input surface comprises a plurality of zones or regions including a right click (or button) region 306, a centerline 350, a left click region 308, a palm region 310, and a thumb region 312. As described in greater detail below, when an input object (e.g., a finger) 340 applies downward force to the surface 302 generally along the arrow 314, the surface 302 resiliently deflects toward the chassis 304. When a predetermined amount of deflection occurs, a button click is detected by an internal switch (not shown).

Figure 4:
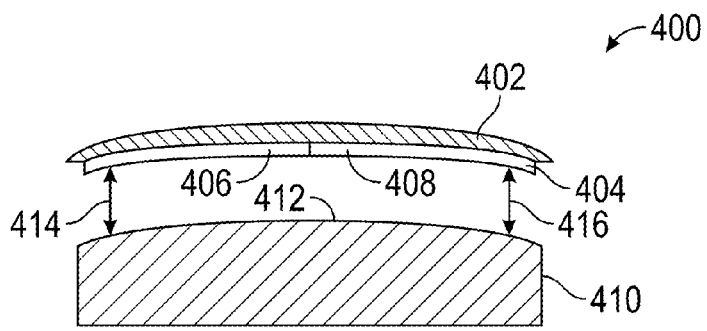
FIG. 4 is a cross section view taken along line IV-IV of FIG. 3, shown in the undeflected state in accordance with an embodiment.

FIG. 4 is a cross section view of the device of in FIG. 3, taken along line IV-IV, shown in the undeflected state. More particularly, a computer mouse 400 includes an input surface 402, a capacitive sensing layer 404 having a right button region 406 and a left button region 408, and a chassis or body 410 having an interactive portion 412. In an embodiment, the interactive portion 412 comprises a conductive surface configured to electrically (e.g., capacitively and particularly transcapacitively) interact with the capacitive sensing layer 404. When the surface 402 deflects toward the chassis 410 in response to applied force, a change in capacitance is detected by the capacitive sensing layer 404. In the undeflected position shown in FIG. 4, the distance 414 between the right region 406 and conductive surface 412 is approximately equal to the distance 416 between the left region 408 and conductive surface 412. Consequently, the capacitive effects of the conductive surface 412 on the right button region 406 is approximately equal to the capacitive effects of the conductive surface 412 on the left button region 406 in the undeflected position.

Figure 5:
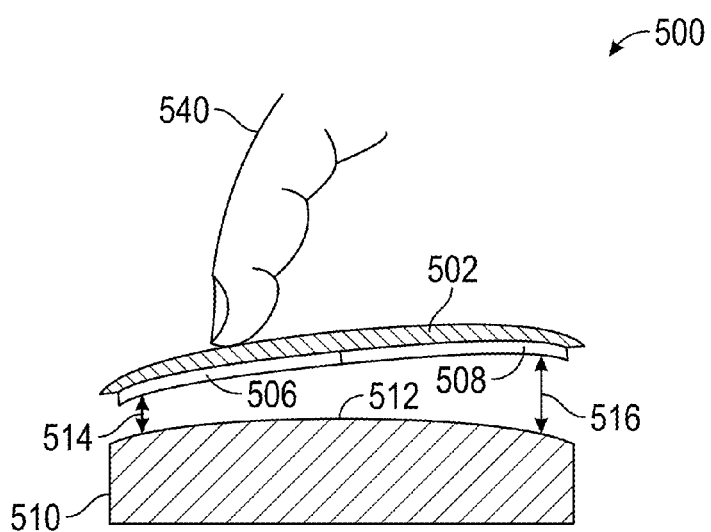
FIG. 5 is a cross section view of the device shown in FIGS. 3 and 4 in a deflected state in accordance with an embodiment.

FIG. 5 depicts a mouse-type input device 500 in a deflected state. In particular, an input object (finger) 540 is shown applying input force to the right button region 506 causing the region 506 to deflect towards the chassis 510. As a result, the decreased distance 514 between the region 506 and the conductive surface 512 effects a change in capacitance in those electrodes associated with region 506. Left button region 508, on the other hand, remains a greater distance 516 from the conductive surface 512 in the deflected position shown in FIG. 5. Consequently, the conductive surface 512 has a different (e.g., lowers) effect on the electrodes comprising the left button region. By processing the resulting signals from the electrodes associated with respective regions 506 and 508, the device may reliably determine whether a right click or left click is intended based on the difference between respective distances 514 and 516, even in the presence of an additional finger (not shown) at the left button region 508.

The conductive surface 412, 512 may be electrically grounded by connecting it to any suitable pin, chip, processor, or the like associated with the device. Alternatively, the conductive surface may be electrically floating (not electrically grounded). Those skilled in the art will appreciate that even if the conductive surface is configured to float, it will likely be effectively grounded when the chassis is grasped by a human operator.

In an alternative embodiment, the input device may be configured to disambiguate a single click as either an intended right click or an intended left click based on various characteristics of the image data received from the capacitive sensing surface. In this regard, it will be appreciated that people generally grasp a computer mouse with their dominant hand; that is, a right-handed person uses a mouse with his/her right hand, whereas a left-handed person grasps the mouse with the left hand. It is also understood that the index finger is most commonly used to perform a mouse click.

Figure 7:
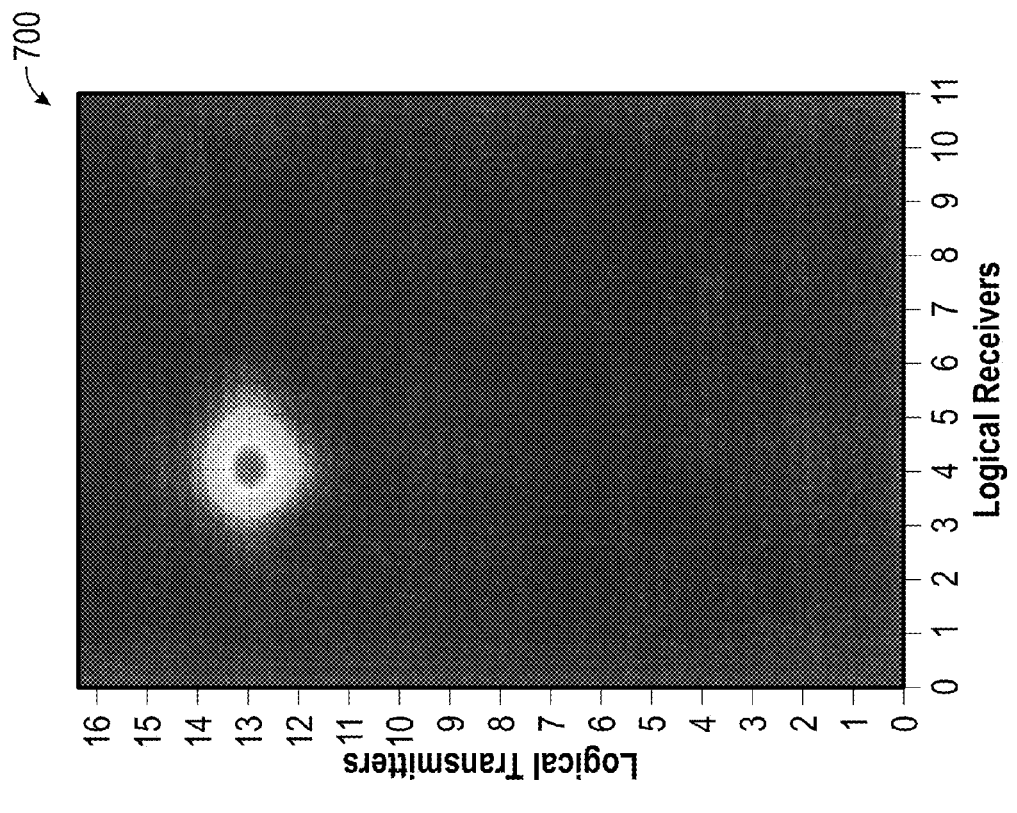
FIG. 7 is an exemplary image of a ring finger in accordance with an embodiment.
Figure 6:
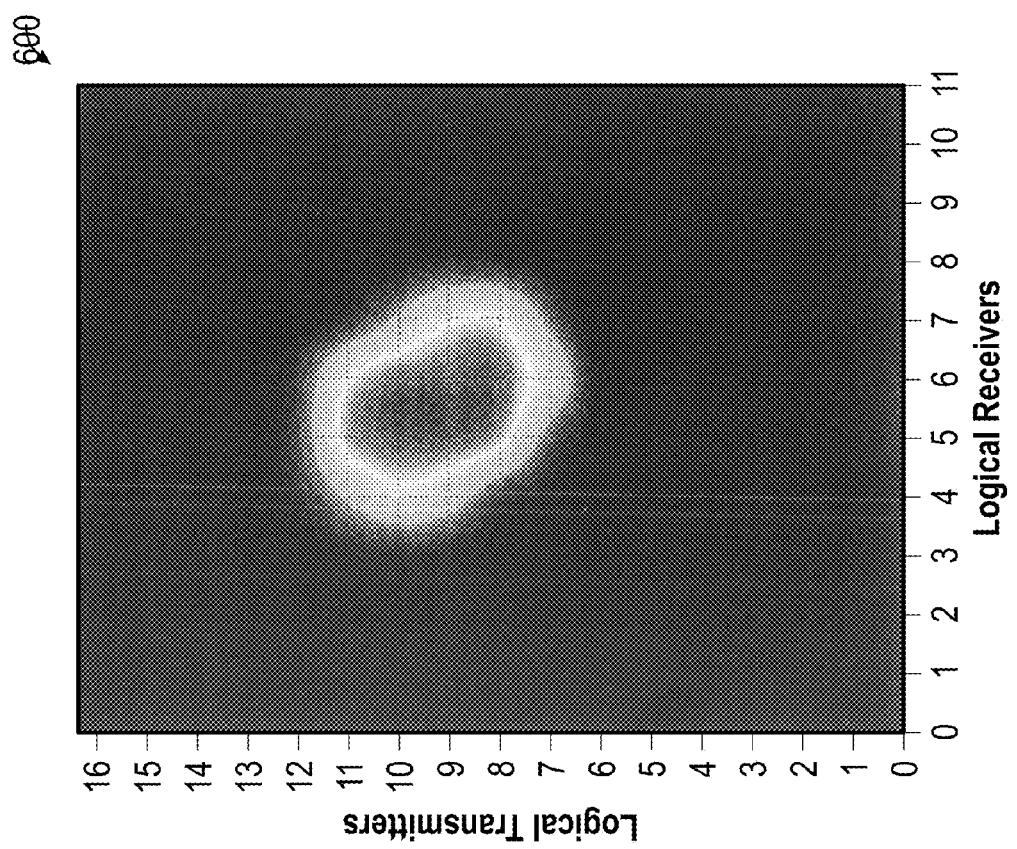
FIG. 6 is an exemplary image of a thumb in accordance with an embodiment.

Referring now to FIGS. 3 and 6-7, capacitive image sensor may be used to determine if a mouse is grasped by a left hand or by a right hand, and thereby automatically toggle back and forth between left and right mouse button functionality. More particularly, when the mouse 300 is grasped by a right hand, the thumb (not shown for clarity) rests against the region 312, and the ring or little finger naturally rests against a corresponding finger region (not seen in FIG. 3) disposed on the opposite side of the device.

In contrast, when the mouse 300 is grasped by a left hand, the ring finger rests against the region 312, and the thumb rests against the opposite side of the sensor surface. By determining the relative positions of the thumb and the ring finger (or, alternatively, the absolute position of the thumb), the device may reliably determine whether it is being grasped by a right or a left hand, and configure the respective regions 306 and 308 accordingly. To aid in disambiguating between a thumb and a ring finger, a thumb image 600 and a ring finger image 700 may be used by the processor associated with the device.

Figure 8:
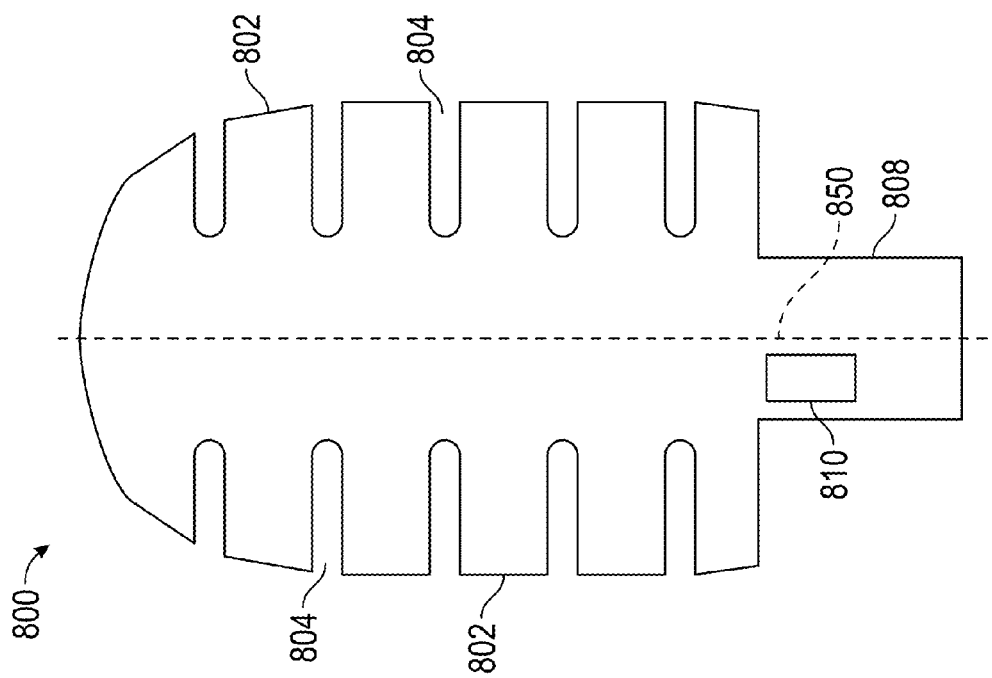
FIG. 8 is a two dimensional flexible printed circuit (FPC) sensor pattern including cutouts to conform to a three dimensional curved mouse cover in accordance with an embodiment.

FIG. 8 is a two dimensional flexible printed circuit (FPC) sensor pattern 800 including conformal cut-outs to facilitate application of the pattern to a three dimensional curved mouse cover. More particularly, the sensor pattern 800 includes a plurality of wings 802 separated by cut-outs 804, and an extension or connector 808 (such as, for example, a flexible flat cable (FFC)) having a processor 810. The cut-outs 804 allow the sensor pattern 800 to be conveniently laminated or otherwise adhered to the inside (or outside) curved surface of a computer mouse or other suitable input device. In an embodiment, a centerline 850 of the FPC sensor pattern 800 may be aligned with the centerline 350 of the mouse 300 (See FIG. 3) to facilitate application of the two-axis sensor pattern to the three dimensional curved input surface of the mouse.

Figure 9:
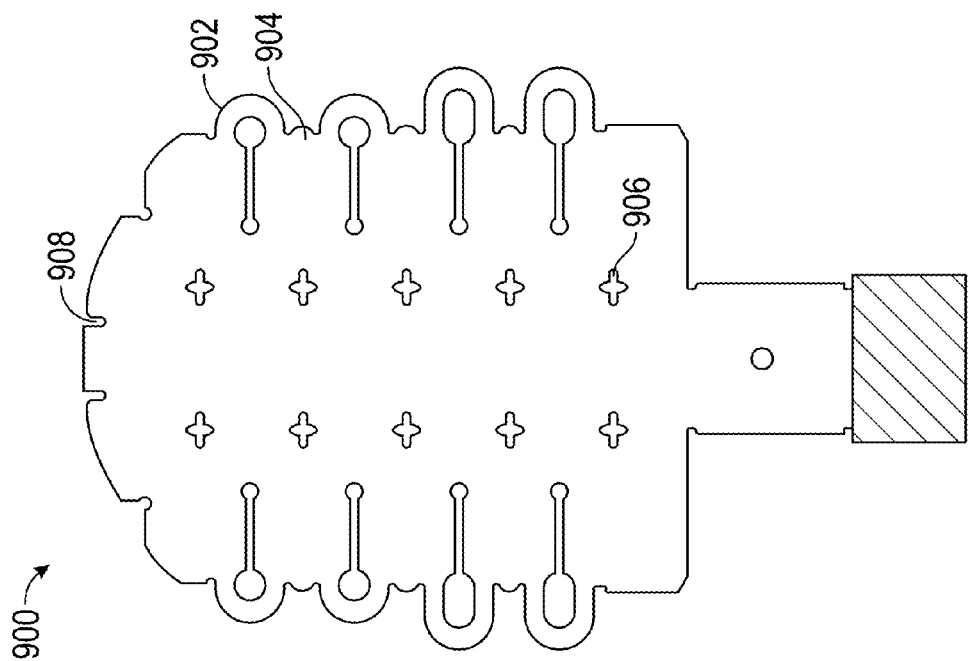
FIG. 9 is a modified version of the FPC of FIG. 8 to include dumbbell extensions on the wings in accordance with an embodiment.

FIG. 9 depicts an FPC sensor pattern 900 similar to that of FIG. 8, modified to include dumbbell extensions 902 on the wings 904. The dumbbell extensions 902 are configure to extend downwardly along one or both sides of the mouse (or other device) such as, for example, in the vicinity of the thumb region 312 and the ring finger region (not shown). In other embodiments, the sensor pattern 900 may also include additional cut-outs to further enhance conformity upon lamination, such as, for example, respective internal cut-outs 906 and respective peripheral cut-outs 908. The dumbbell extensions 902 effectively increase the surface area of the button regions, providing an enhanced ability to detect finger gestures on the side(s) of the mouse.

Referring now to FIGS. 10-13, various topologies for arranging transmitter and receiver electrodes for detecting finger presence within the dumbbells will now be described.

Figure 11:
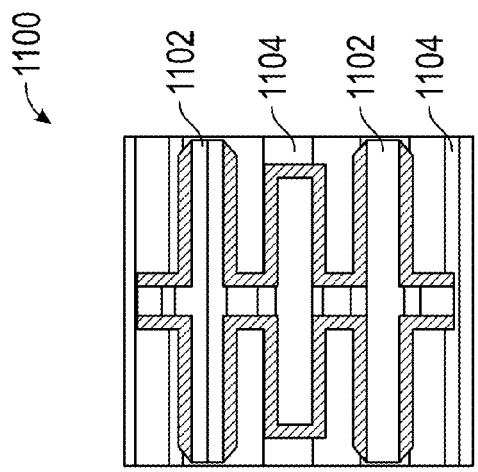
FIG. 11 is an enlarged view of the FPC sensor pattern of FIG. 10 illustrating the relative orientation of the transmitter and receiver electrodes in accordance with an embodiment.
Figure 10:
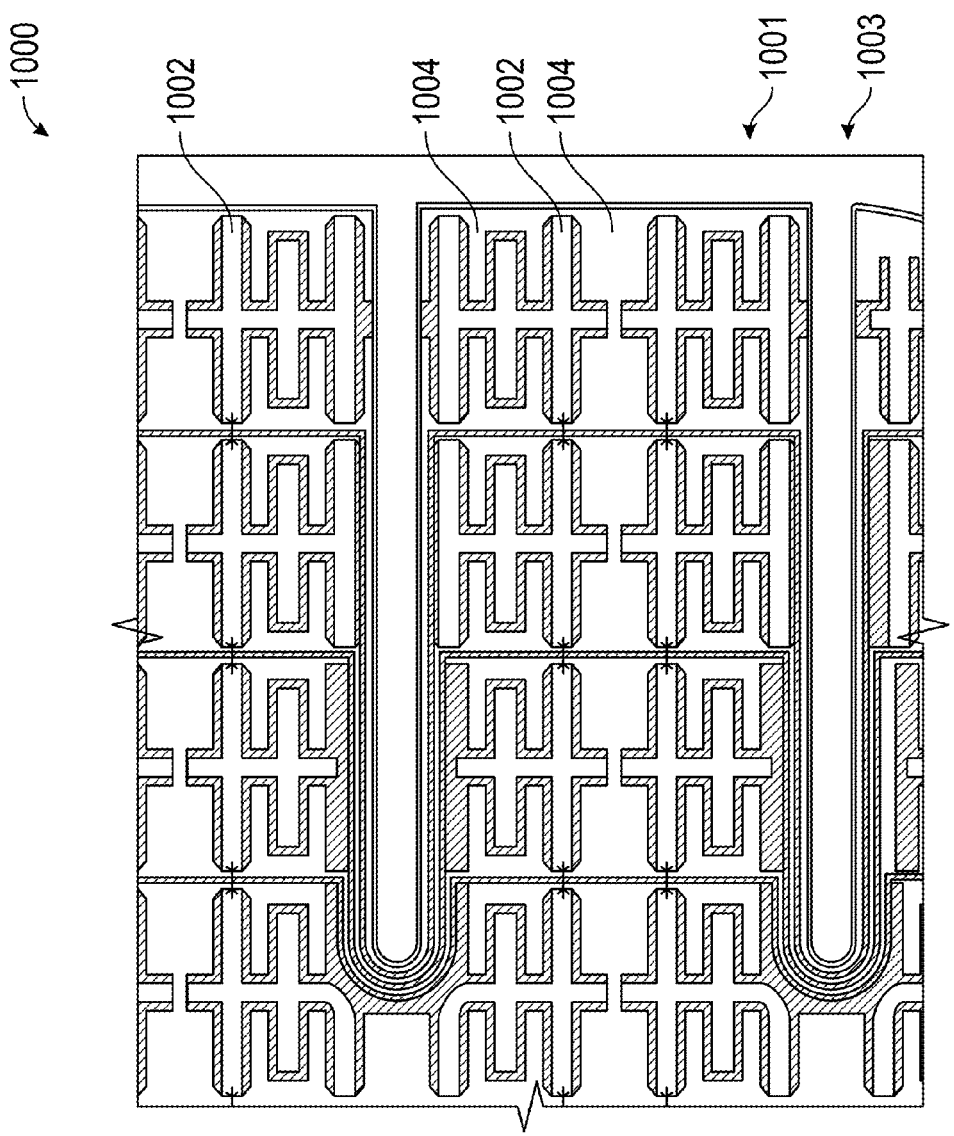
FIG. 10 is a detailed view of the layout of the transmitter and receiver electrodes for the FPC sensor pattern of FIG. 9 in accordance with an embodiment.

More particularly and with reference to FIG. 10, an exemplary electrode pattern 1000 includes a plurality of wings 1001 separated by respective cut-outs 1003. The pattern 1000 generally, and wings 1001 in particular, include a plurality of respective horizontally extending receiver electrodes 1002 interleaved among a plurality of respective vertically extending transmitter electrodes 1004. FIG. 11 is an enlarged view of a section 1100 the electrode pattern of FIG. 10, illustrating respective horizontal receiver electrodes 1102, and associated vertical transmitter electrodes 1104.

Figure 13:
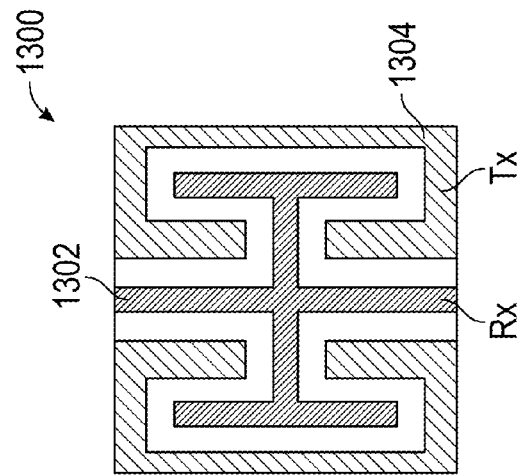
FIG. 13 is an enlarged view of a portion of the FPC sensor pattern of FIG. 12 illustrating the relative orientation of the transmitter and receiver electrodes in accordance with an embodiment.
Figure 12:
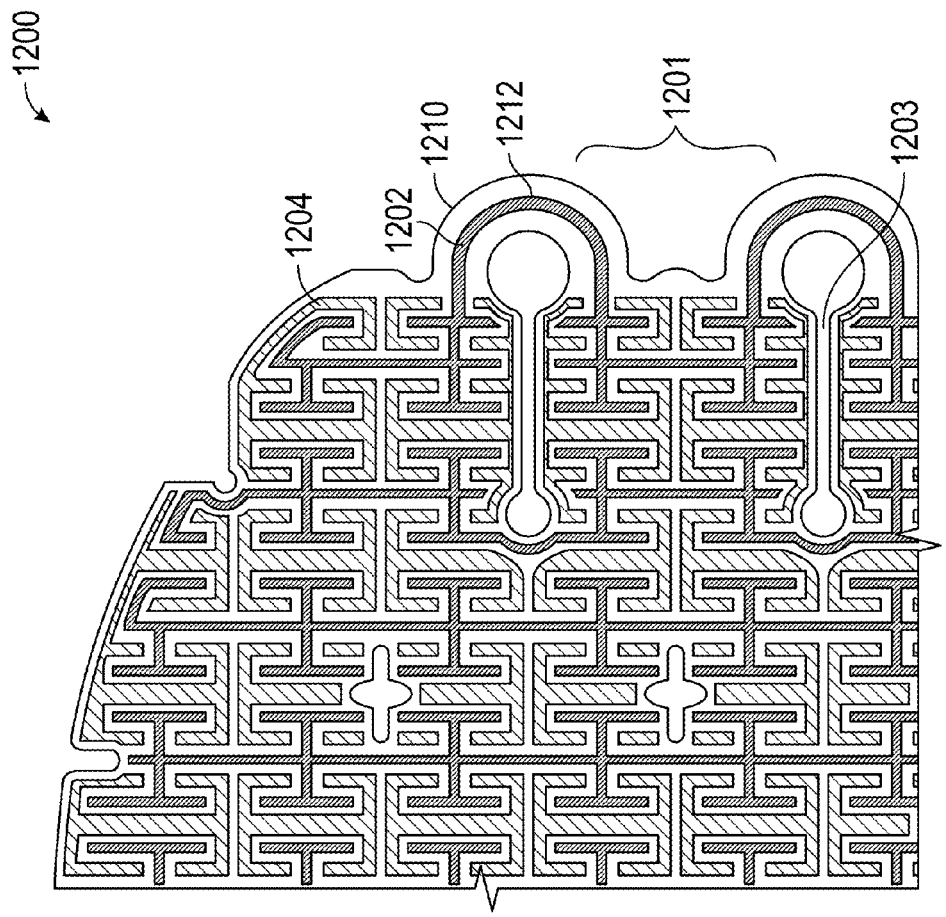
FIG. 12 is an alternate layout of the transmitter and receiver electrodes for the FPC sensor pattern of FIG. 9 in accordance with an embodiment.

Referring now to FIG. 12, an exemplary electrode pattern 1200 includes a plurality of wings 1201 separated by respective cut-outs 1203, wherein the distal ends of adjoining wings merge to form a dumbbell extension 1210. The pattern 1200, and particularly the wings 1201, includes a plurality of respective horizontally extending transmitter electrodes 1202 interleaved among a plurality of respective vertically extending receiver electrodes 1204, wherein the respective distal portions of adjacent perimeter receiver electrodes merge to form dumbbell receiver electrodes 1212 within the dumbbell extension 1210. FIG. 13 is an enlarged view of a section 1300 the electrode pattern of FIG. 12, illustrating respective vertical receiver electrodes 1302, and associated horizontal transmitter electrodes 1304.

Figure 14:
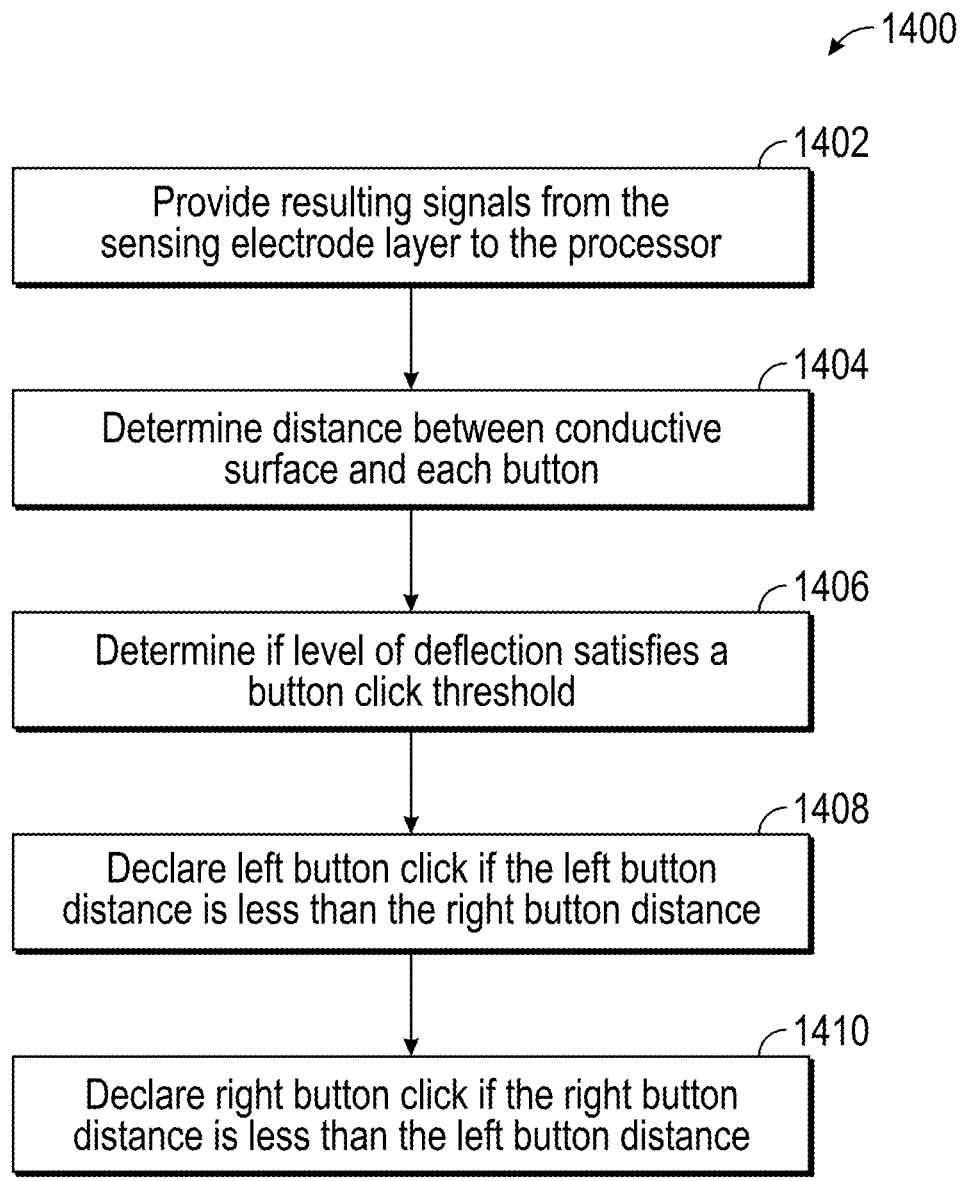
FIG. 14 is a flow diagram setting forth an exemplary method for distinguishing between left and right button clicks on a computer mouse in accordance with an embodiment.

FIG. 14 is a flow diagram setting forth an exemplary method 1400 for distinguishing between left and right button clicks on a computer mouse. More particularly, the method 1400 involves providing resulting signals from the sensing electrode layer to the processor (Task 1402) and, based on the resulting signals, determining the distance between the conductive surface of the chassis and each of the left and right button regions, respectively (Task 1404). The method 1400 further involves determining if the level of deflection satisfies a predetermined "click" threshold (Task 1406). If so, the device declares either: i) a left button click if the left button has been depressed to a greater degree than the right button (Task 1408); or ii) a right button click if the right button has been depressed to a greater degree than the left button (Task 1410).

An input device for use with an electronic system is thus provided which includes a chassis having an interactive region; an input surface configured to deflect relative to the chassis in response to applied force, the input surface having a first region and a second region; and a processor communicatively coupled to the input surface and configured to disambiguate the first and second regions based on interaction between the input surface and the interactive region, wherein the input surface may comprise a capacitive touch sensor.

In an embodiment, the touch sensor processor is configured to generate a composite signal including: i) touch information relating to input objects contacting at least one of the first and second regions; and ii) force information relating to deflection of the input surface responsive to applied force. The processor may be configured to use the force information to select either the first or second region.

In another embodiment, the input device includes a computer mouse, where the first region corresponds to a left mouse button and the second region corresponds to a right mouse button, and input surface comprises a curved dome.

In another embodiment the input device includes a switch configured to detect deflection of the dome beyond a predetermined threshold level of deflection.

In a further embodiment, disambiguating comprises the processor at least partially de-convolving the composite signal and processing the force information to determine whether the applied force is attributable to the first or to the second region.

In yet a further embodiment, the interactive region comprises a conductive surface of the chassis, wherein interaction between the input surface and the interactive region comprises deflecting the input surface towards the conductive surface.

In another embodiment, disambiguating comprises determining the relative magnitude of: i) a first distance between the first region and the conductive surface; and ii) a second distance between the second region and the conductive surface.

In another embodiment, disambiguating further comprises: i) determining a first region click if the first distance is less than the second distance; and ii) determining a second region click if the first distance is greater than the second distance.

A method is also provided for distinguishing between left and right button clicks on a computer mouse of the type including a processor, a chassis having a conductive surface, and a dome having a layer of capacitive sensing electrodes defining a left button region and a right button region and configured to deflect relative to the chassis in response to applied force. The method includes: providing resulting signals from the capacitive sensing electrode layer to the processor, the resulting signals including a touch component relating to respective input objects contacting the left and right button regions, and a force component relating to capacitive coupling between the capacitive sensing electrode layer and the conductive surface; and determining, by the processor based on the resulting signals, the distances between each of the left and right button regions, respectively, and the conductive surface.

In an embodiment, the method also includes declaring one of a left button click and a right button click based on the determining step.

In another embodiment, the computer mouse is of the type which includes a tach switch configured to detect deflection of the dome, and the method also includes detecting a predetermined threshold level of deflection of the dome corresponding to a button click; and determining a left button click if the distance between the left button region and the conductive surface is less than the distance between the right button region and the conductive surface when the button click is detected.

In a further embodiment, the conductive surface may be electrically grounded.

A further embodiment of the method involves at least partially de-convolving the resulting signals and processing at least a portion of the force component to determine whether the applied force is primarily attributable to the left or the right button region.

A processing system is also provided for use with a computer mouse of the type including: a dome including first and second button regions on a capacitive sensor layer configured to sense input objects; a chassis having a conductive region for capacitive coupling with the capacitive sensor layer; and a spring mechanism configured to facilitate deflection of the dome in response to force applied by an input object. In an embodiment, the processing system is configured to: receive a capacitive image from the capacitive sensor layer; and determine, based on the capacitive image, a first distance between the conductive region and the first button region, and a second distance between the conductive region and the second button region when the dome is deflected.

In an embodiment, the processing system is further configured to: select a first button click if the first distance is less than the second distance; and select a second button click if the first distance is greater than the second distance.

In a further embodiment, the capacitive image comprises a composite signal including a touch component relating to respective input objects contacting the first and second button regions, and a force component relating to the capacitive coupling between the capacitive sensor electrode layer and the conductive region.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device comprising:
    a chassis having an interactive region comprising a conductive surface;
    an input surface configured to deflect relative to the conductive surface in response to applied force, the input surface comprising a capacitive sensing layer comprising a plurality of transmitter electrodes and a plurality of receiver electrodes, the capacitive sensing layer has a first region and a second region, wherein the capacitive sensing layer has an electrical interaction with the conductive surface, and wherein the conductive surface is grounded; and
    a processing system communicatively coupled to the input surface and configured to:
        transmit a transmitter signal using the plurality of transmitter electrodes,
        receive, using the plurality of receiver electrodes, a resulting signal comprising effects of the transmitter signal and the electrical interaction between the conductive surface and the capacitive sensing layer,
        determine, from the resulting signal, force information attributable to a relative magnitude of deflection, toward the conductive surface, of the first region as compared to deflection, toward the conductive surface, of the second region in response to an applied force, and
        disambiguate the first region and the second region based on the relative magnitude of deflection in the force information.

2. The input device of claim 1, wherein the resulting signal is a composite signal further comprising touch information relating to input objects contacting at least one of the first region and the second region.

3. The input device of claim 1, wherein the processing system is further configured to use the force information to select either the first region or the second region.

4. The input device of claim 1, wherein the input device comprises a computer mouse, and further wherein the first region corresponds to a left mouse button and the second region corresponds to a right mouse button.

5. The input device of claim 4, wherein the input surface comprises a curved dome.

6. The input device of claim 5, further comprising a switch configured to detect deflection of the dome beyond a predetermined threshold level of deflection.

7. The input device of claim 2, wherein disambiguating comprises the processing system at least partially de-convolving the composite signal and processing the force information to determine whether the applied force is attributable to the first region or to the second region.

8. The input device of claim 1, wherein the relative magnitude accounts for:
    i) a first distance between the first region and the conductive surface; and
    ii) a second distance between the second region and the conductive surface.

9. The input device of claim 8, wherein disambiguating comprises:
    i) determining a first region click if the first distance is less than the second distance; and
    ii) determining a second region click if the first distance is greater than the second distance.

10. A method for distinguishing between left and right button clicks on a computer mouse of the type including a processor, a chassis having a conductive surface, and a dome having a layer of capacitive sensing electrodes defining a left button region and a right button region and configured to deflect relative to the conductive surface in response to an applied force, wherein the capacitive sensing electrodes has an electrical interaction with the conductive surface, and wherein the conductive surface is grounded, the method comprising:
    providing resulting signals from the layer of capacitive sensing electrodes to the processor, the resulting signals including:

a touch component relating to respective input objects contacting the left button region and the right button region, and a force component attributable to capacitive coupling between the capacitive sensing electrode layer and the conductive surface, wherein the capacitive coupling is affected by a first distance between the left button region and the conductive surface and a second distance between the right button region and the conductive surface; and determining, by the processor based at least in part on the force component in the resulting signals, the first distance and the second distance.

11. The method of claim 10, further comprising declaring one of a left button click and a right button click based on the determining step.

12. The method of claim 11, wherein the computer mouse is of the type which includes a tach switch configured to detect deflection of the dome, and wherein the method further comprises;

detecting a predetermined threshold level of deflection of the dome corresponding to a button click; and determining the left button click if the distance between the left button region and the conductive surface is less than the distance between the right button region and the conductive surface when the button click is detected.

13. The method of claim 10, further comprising at least partially de-convolving the composite signal and processing at least a portion of the force component to determine whether the applied force is primarily attributable to the left button region or the right button region.

14. A processing system for use with a computer mouse of the type including: a dome including a first button region and a second button region on a capacitive sensor layer configured to sense input objects, the capacitive sensor layer comprising a plurality of transmitter electrodes and a plurality of receiver electrodes; a chassis having a conductive region for capacitive coupling with the capacitive sensor layer, wherein the conductive region is grounded; and a spring mechanism configured to facilitate deflection of the dome in response to force applied by an input object;

wherein the processing system is configured to:

transmit a transmitter signal using the plurality of transmitter electrodes;

receive a capacitive image from the capacitive sensor layer using the plurality of receiver electrodes, wherein the capacitive image comprises effects of the transmitter signal and a force component attributable to the capacitive coupling between the capacitive sensor layer and the conductive region, wherein the capacitive coupling is affected by a first distance between the left button region and the conductive surface and a second distance between the right button region and the conductive surface; and determine, based at least in part on the force component in the capacitive image, the first distance between the conductive region and the first button region, and the second distance between the conductive region and the second button region when the dome is deflected.

15. The processing system of claim 14, wherein the processing system is further configured to:

select a first button click if the first distance is less than the second distance; and select a second button click if the first distance is greater than the second distance.

* * * * *